United States Patent [19]

Georgens et al.

[11] Patent Number: 4,642,721
[45] Date of Patent: * Feb. 10, 1987

[54] MAGNETIC TAPE CARTRIDGE WITH INCREASED DATA PACKING DENSITY

[75] Inventors: Harold H. Georgens, Rancho Santa Fe; Dean L. Christensen, Bonsall, both of Calif.

[73] Assignee: Data Electronics, Inc., San Diego, Calif.

[*] Notice: The portion of the term of this patent subsequent to Jan. 6, 2004 has been disclaimed.

[21] Appl. No.: 677,197

[22] Filed: Dec. 3, 1984

Related U.S. Application Data

[63] Continuation-in-part of Ser. No. 533,640, Sep. 19, 1983.

[51] Int. Cl.$^4$ ............................................. G11B 23/02
[52] U.S. Cl. ..................... 360/132; 242/192; 242/198; 360/94
[58] Field of Search ............... 360/132, 134, 131, 94; 242/192, 197–200

[56] References Cited

U.S. PATENT DOCUMENTS

| | | | |
|---|---|---|---|
| 4,093,149 | 6/1978 | Shroff et al. | 242/192 X |
| 4,172,569 | 10/1979 | Newell | 242/192 |
| 4,199,794 | 4/1980 | Prost et al. | 242/192 X |
| 4,457,473 | 7/1984 | Mroz et al. | 242/192 |
| 4,502,648 | 3/1985 | Newell | 242/192 |

*Primary Examiner*—John H. Wolff
*Assistant Examiner*—David J. Severin
*Attorney, Agent, or Firm*—Christie, Parker & Hale

[57] ABSTRACT

A digital magnetic recording tape cartridge has a housing that permits use of up to ¼-inch wide tape which, in turn, increases data recording packing density over standard 0.150-inch tape cartridges. The tape cartridge is the belt-driven type having a flexible elastic endless belt that applies tension to tape on the supply and take-up reels to move the tape. Rotation of a driving roller causes the belt to drive the tape reels and move the tape between the reels. A magnetic head of the tape transport engages an exposed portion of the tape in the cartridge for reading or writing data on the tape. In a preferred embodiment, the tape is ¼-inch wide. The number of data tracks is substantially increased by the wider ¼-inch tape. The cartridge housing has a base plate with a stepped down recess that accommodates the wider ¼-inch tape and the wider supply and take-up reels, tape guide rollers, and tape guide pins. The cartridge has flanges along both sides of recessed grooves in the sides of the cartridge that permit the cartridge to be inserted into a tape drive capable of interchangeably receiving the ¼-inch tape cartridge of this invention or the standard 0.150 inch tape cartridge.

5 Claims, 6 Drawing Figures

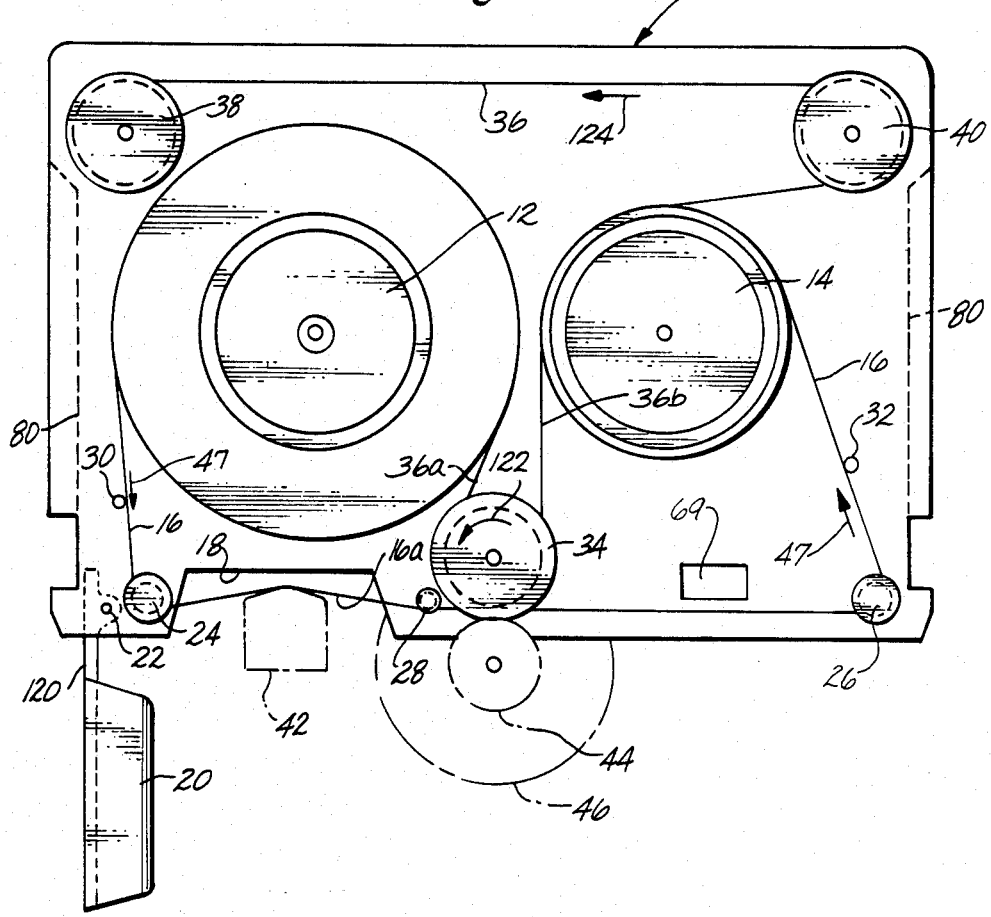

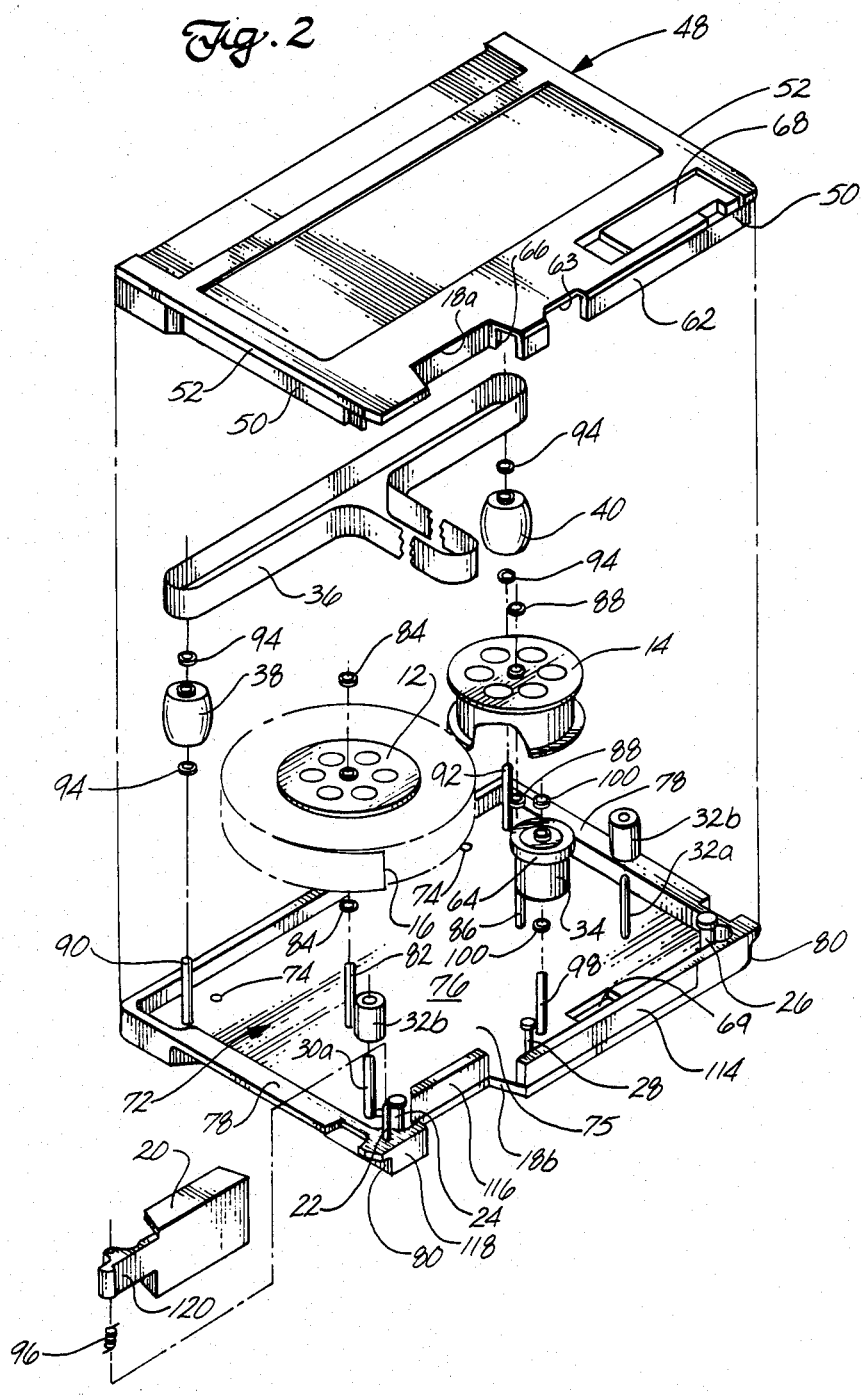

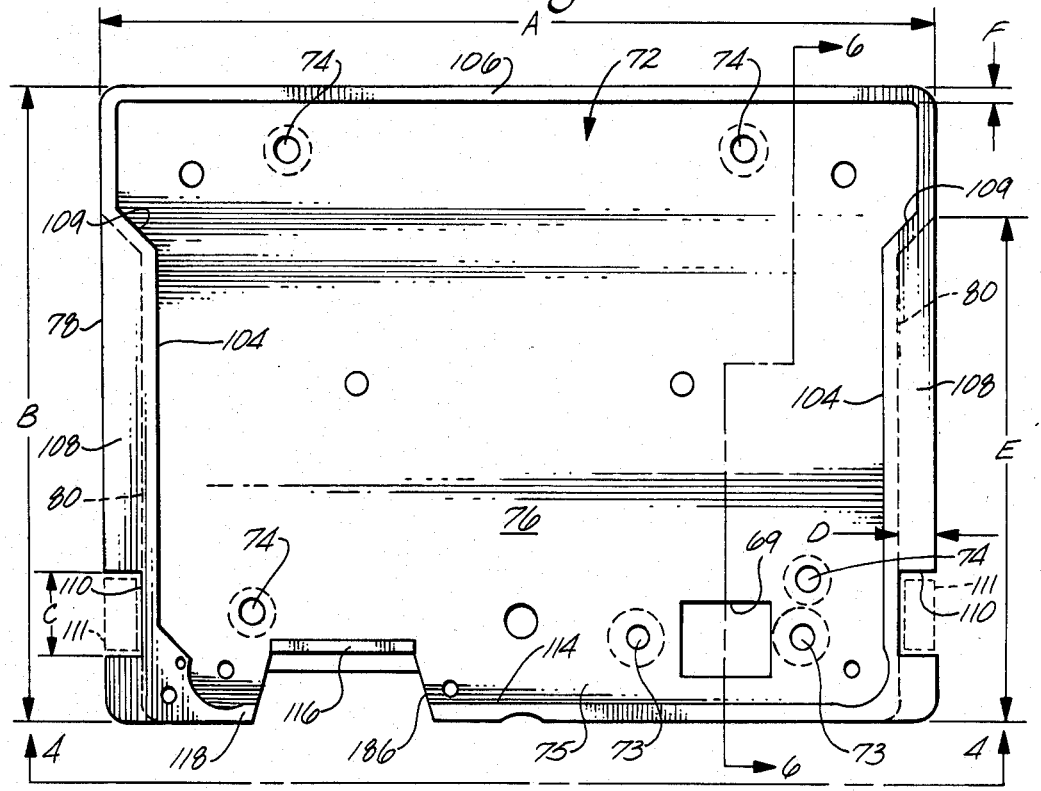
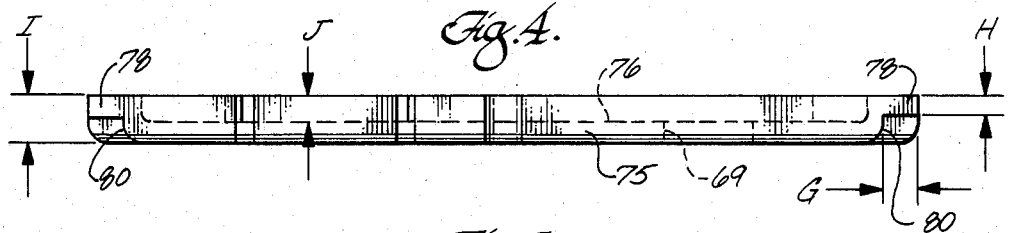
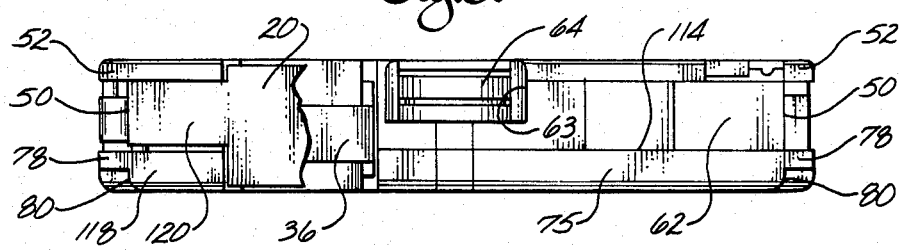
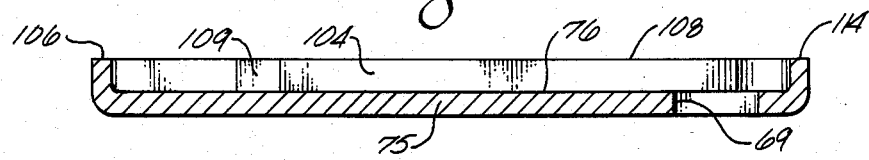

MAGNETIC TAPE CARTRIDGE WITH INCREASED DATA PACKING DENSITY

CROSS REFERENCE

This is a continuation-in-part of application Ser. No. 533,640, filed Sept. 19, 1983.

BACKGROUND OF THE INVENTION

1. Field of the Invention

This invention relates to magnetic tape cartridges of the belt-driven type, namely, a two-reel cartridge in which a drive belt contacts the tape on the reels and is driven to move the tape between the reels. More particularly, the invention relates to a cartridge housing that permits use of a ¼-inch wide tape. The tape housing can be compatible in the same tape drive with a standard sized data cartridge having a smaller tape width, while increasing data track packing density over the packing density available with the standard data cartridge.

2. Description of the Prior Art

Magnetic tape cartridges such as the Scotch DC300XL data cartridge made by 3M Co. have been used for years for data storage in tape cartridge drives. Briefly, this type of standard tape cartridge includes a ¼-inch wide magnetic tape enclosed within a housing. The tape is driven by a flexible elastic endless belt that applies tension against the tape on the supply and take-up reels to move the tape from one reel, past a magnetic read/write head, and onto the other reel. The drive belt is driven by an exposed belt driving roller in the cartridge engaged by a capstan driven by a drive motor in the tape transport. Rotation of the belt driving roller causes the belt to drive the tape reels to tension the tape and move the tape between the reels. The tape cartridge also includes a door near a corner of the housing. The cartridge door is normally spring biased to a closed position for protecting the tape during storage. When the cartridge is inserted into a tape transport, the door is tripped open to expose a portion on the tape for engaging the magnetic read/write head in the tape transport. Data can be digitially recorded in a number of data tracks recorded at different vertical elevations along the tape. The cartridge drive permits rapid bi-directional acceleration and deceleration of the tape by a single reversible drive motor.

Another data cartridge manufactured by 3M Co. is a so called mini-cartridge referred to as the Scotch brand DC100A and DC1000 data cartridge which uses a tape having a width of 0.150 inch. The data cartridge is a bidirectional unit with an internal belt drive system, and is similar to but smaller in overall dimensions to the Scotch brand DC300XL data cartridge.

In recent years, magnetic digital recording technology has focused on increasing the packing density of the data tracks recorded on a tape in the type of tape cartridges described above. The width of a standard sized tape limits the number of data tracks that can be recorded on the tape. Improvements in read/write head technology have included vertically movable heads or multiple read/write heads for recording as many tracks as physically possible within the confines of the standard tape width.

Compatiblity of data cartridges is important because of the expense that can be saved by having several cartridges of different tape width compatible with a single tape drive unit. The 0.150-inch mini-cartridge and the larger ¼-inch data cartridge are not compatible in the same tape drive unit.

SUMMARY OF THE INVENTION

This invention provides a belt-driven, two-reel magnetic digital recording tape cartridge having a housing that can be of mini-cartridge size while permitting use of a wider tape than the standard 0.150-inch tape. The tape is wound on a pair of tape reels in the housing and is exposed along a portion of the housing for access by a magnetic read/write head. A drive belt in the housing contacts the tape on the tape reels, and a belt driving roller in the housing is engaged by the belt and driven by the drive capstan of a tape transport. Rotation of the belt driving roller causes the belt to drive the tape reels and tension the tape to move the tape bi-directionally between the two reels. The housing has a base plate on which the tape reels are supported, and a cover is fastened to the base plate for enclosing the tape reels in the housing. A pair of side flanges extend along opposite sides of the housing at an intermediate elevation between the top of the cover and the bottom of the base plate. The side flanges extend at an elevation between opposing cartridge guide slots adjacent an upper portion of the housing and opposing recessed lower side walls that form a stepped-down lower portion of the base plate. The guide slots cooperate with side rails in a tape transport for guiding the cartridge into a locked position in the tape transport. A tape having a width greater than 0.150-inch, preferably ¼-inch wide, is wound on tape reels contained within the cartridge housing. The stepped-down lower portion of the base plate provides depth to the internal space within the housing for accommodating the wider tape. Since the tape contained in the housing is wider than the standard 0.150-inch magnetic data tape, the packing density of data tracks recorded across the wider tape is increased. Moreover, the side flanges are located at an elevation along the sides of the cartridge housing below the guide slots that permits the cartridge to be inserted into a tape transport receptacle that accommodates a ¼-inch data cartridge of this invention, as well as the standard 0.150-inch data cartridge.

These and other aspects of the invention will be more fully understood by referring to the following detailed description and the accompanying drawings.

DRAWINGS

FIG. 1 is a semi-schematic plan view illustrating features of a tape cartridge according to principles of this invention.

FIG. 2 is an exploded perspective view showing a detailed arrangement of the elements of the tape cartridge illustrated in FIG. 1.

FIG. 3 is a plan view illustrating a base plate of the tape cartridge.

FIG. 4 is a front elevation view taken on line 4—4 of FIG. 3.

FIG. 5 is a front elevation view, partly broken away, showing the top of the cartridge joined to the base plate.

FIG. 6 is a cross-sectional view taken on line 6—6 of FIG. 3.

DETAILED DESCRIPTION

FIG. 1 illustrates a magnetic digital recording tape cartridge according to principles of this invention. Portions of the tape transport used with the cartridge are illustrated in phantom lines. The tape cartridge includes a housing 10 containing a pair of tape reels in the form of a supply hub 12 and a take-up hub 14. A magnetic recording tape 16 is wound on both hubs and passes from one hub to the other. The tape passes through a recess 18 in an edge of the tape cartridge housing. A door 20 pivots on a pivot pin 22 at a corner of the housing. The door mechanism has a return spring (not shown in FIG. 1) that normally closes the door over a portion 16a of the tape exposed in the recess 18. Other portions of the tape cartridge include a pair of main tape guide rollers 24 and 26, an intermediate tape guide roller 28, and a pair of tape guide pins 30 and 32. Alternatively, the tape guide pins can be replaced by guide rollers. The front of the cartridge housing also has an exposed portion of a belt driving roller 34 around which a flat, flexible elastic endless drive belt 36 is wound. The belt 36 is wrapped around the belt driving roller, around a pair of belt guide rollers 38 and 40 in the rear corners of the cartridge, and against portions of the tape on the reel hubs 12 and 14.

When the tape cartridge is inserted into a receptacle of a tape transport, the door 20 is tripped open and retained in its open position to expose the portion 16a of the tape in the recess 18. The exposed portion of the tape is engaged by a magnetic read/write head 42 of the tape transport. The cartridge door is shown in its fully open position in FIG. 1. When the tape cartridge is locked in place in the tape transport, a drive capstan 44 on the tape drive motor 46 engages the belt driving roller 34 for driving the tape 16 in the direction of the arrows 47 shown in FIG. 1. The length of the belt 36 is less than the length of the belt guidepath so that, when the belt is stetched into position along the guide path, it will have an installed tension or pretension. An angle of wrap of the belt of at least 60° at each of the reel hubs provides necessary contact between the belt and the tape wound on the reel hubs. This assures good frictional driving of the tape and driving of the reel hubs by the belt. The pretension in the belt provides the frictional contact force between the belt guide rollers and their respective support shafts; it provides frictional engagement force between the belt and the tape; and it presses the tape layers together on the reels to prevent slippage between the tape layers. The belt pretension is sufficient to permit rapid bi-directional acceleration and deceleration of the tape without slippage.

Detailed construction of the tape cartridge is best understood by referring to FIG. 2. The cartridge includes a generally rectangular rigid plastic cover 48. Recessed regions 50 extend along each side wall of the cover. Each recess extends along most of the length of each side wall. Side flanges 52 protrude outwardly from the top of the cover over the recessed regions 50.

The front edge of the cover includes a front wall 62 extending downwardly and perpendicularly to the top plane of the cover. The front wall has an opening 63 to accommodate an upper flange 64 of the belt drive roller 34. The front edge of the cover also includes a tape head recess 18a and an opening 66 through which the tape travels as it passes away from the read/write head. A record select slide bar 68 is mounted at the front corner of the cover 48. A mirror void 69 in the base plate allows for light exposure to a mirror (not shown) mounted over the void. Mounting holes 73 are used for mounting a mirror block (not shown).

The cartridge housing also includes a rectangular base plate 72 secured to the bottom of the cover. The base plate is secured to the cover by fasteners (not shown) that pass through openings 74 near the four corners of the base plate. The fasteners are screwed into internally threaded receptacles (not shown) in the underside of the cover. The base plate has a bottom wall or floor 75 with a flat bottom surface 76 recessed below a pair of side flanges 78 extending along opposite sides of the base plate. The side flanges 78 extend along the top of the base plate; and when the cover is secured to the base plate, the side flanges extend at an intermediate elevation between the top of the cover and the floor 75 of the base plate. Recessed regions 80 extend along each side of the base plate below the side flanges 78. The recessed regions extend most of the length of each side of the base plate and are open to the front corners of the base plate. The front edge of the base plate includes a door recess 18b that registers with the door recess 18a in the cartridge cover for accommodating the door 20 that opens and closes over the exposed portion 16a of the tape. Further details of the base plate 72 will be described below.

The recessed bottom surface 76 of the base plate supports the hubs of the tape supply reel and take-up reel. The hub 12 for the supply reel is spool-shaped, i.e., it is flanged at its top and bottom. The spacing between the flanges of the supply reel accommodates a magnetic data tape ¼-inch in width. Although the the preferred embodiment is a ¼-inch tape, other tape widths greater than 0.150-inch up to ¼-inch can be used. The supply hub is mounted for rotation on a ⅛-inch diameter stainless steel dowel pin axle 82 affixed to the bottom surface 76 of the base plate. Anti-friction material shim washers 84 are mounted on the dowel pin roller 82 on opposite sides of the upper and lower flanges of the supply hub. The take-up reel 14 is a similar flanged hub mounted on a dowel pin roller 86 with similar anti-friction material shim washers 88.

The belt guide rollers 38 and 40 in the rear corners of the cartridge are mounted on ⅛-inch diameter stainless steel dowel pin axles 90 and 92 affixed to the recessed bottom surface 76 of the base plate. The belt guides are preferably crown-shaped, low-friction plastic rollers with brass anti-friction retainer washers 94 for mounting the rollers in the corners of the base plate. Belt tension adjusters (not shown) for the belt guide rollers are described below.

The three tape guide rollers 24, 26 and 28 are stainless steel flanged guides mounted near the front edge of the base plate. The tape guide rollers align the tape in its travel along the front edge of the cartridge. The tape guide pins 30 and 32 shown in FIG. 1 can be replaced with flanged tape guide rollers 32b mounted to dowel pin axles 32a and 32b.

The door pivot pin 22 is mounted on the flange 78 at the front corner of the base plate. The pin mounts the door 20 for rotation with or against the bias of a torsion spring 96.

The belt drive roller 34 is a flanged crown-shaped roller mounted on a dowel pin axle 98 inboard at the front edge of the base plate. A pair of anti-friction material shim washers 100 mount the belt drive roller between the cover and the base plate. The flange 64 at the upper edge of the belt drive roller 34 protrudes through the opening 63 in the front edge of the cover so that the flange is exposed at the front of the assembled cartridge.

Further detailed construction of the base plate is understood best by referring to FIGS. 3 through 6 in conjunction with FIG. 2. FIG. 3 is plan view looking down at the inside surface 76 of the base plate 72. Narrow side walls 104 extend along opposite sides of the base plate, and a narrow rear side wall 106 extends along the rear edge of the base plate. The side walls extend above the upper surface 76 of the bottom wall 75 of the base plate, so that the bottom wall is stepped down with respect to the top surface of the side flanges 78 extending along the side walls 104. The side flanges on opposite sides of the base plate have upper surfaces 108 continuous with the upper surface of the rear wall 106 of the base plate. The recessed regions 80 extending along the opposite side walls 104 of the base plate, adjacent the recessed stepped-down portion of the base plate, are similar in length to the recessed regions 50 extending along opposite sides of the cartridge cover 48. The side walls 104 are angled outwardly at 109 so the walls form angled ends of the recessed side regions 80 of the base plate. Grooves 110 are formed in the side flanges of the base plate a short distance inward from the front edges of the flanges. A front wall 114 extends along the front edge of the base plate from the corner nearest the guide roller 26 to the door recess 18b. A recessed front wall 116 extends along the front edge of the base plate to the door recess 18b. The upper surfaces of the walls 116b and 118 are at the same elevation as upper surfaces 108 of the side walls and the rear wall. Fasteners (not shown) for joining the cover to the base plate extend through the holes 74 in the bottom side walls of the base plate. The bottom side walls of the cover bear against the upper surfaces 108 of the rear and side walls of the base plate and the top surfaces of the front walls 114, 116 and 118, when the cover is joined to the base plate.

In a preferred embodiment, the length of the base plate (dimension A) is about 3.2 inches, and the width of the base plate (dimension B) is about 2.4 inches. The length of the grooves 110 in the sides flanges of the base plate (dimension C) is 0.312 inch, and the depth of the grooves (dimension D) is 0.14 inch. The maximum length of the recesses 80 adjacent the side walls 104 (dimension E) is about 1.8 inch. The width of the rear and side walls (dimension F) is 0.062 inch; the depth of the flanges (dimension G) is 0.14 inch; and the thickness of each flange (dimension H) is 0.08 inch. The maximum depth of the base plate (dimension I) is 0.18 inch, and the depth above the bottom surface 76 of the base plate (dimension J) is 0.08 inch.

FIG. 3 also shows mounting holes for other components of the cartridge that are supported on the base plate, such components including the supply and take-up hubs, the belt guide rollers, the belt drive capstan, etc.

FIG. 5 is a front elevation of the assembled tape cartridge, with the top cover joined to the base plate. This view illustrates the side flanges 78 projecting outwardly at an intermediate elevation between the top of the cover and the bottom of the base plate. The flanges 52 at the top of the cover and the flanges 78 on the base plate cooperate with the recessed regions 50 to form cartridge guiding slots along opposite sides of the cartridge housing. FIG. 5 also illustrates how the stepped-down portion of the base plate accommodates the wider ¼-inch magnetic tape, and its wider reel hubs, guide rollers, and guide pins. The top flange 64 of the belt driving roller is shown exposed for contact with the tape transport drive motor at the front of the tape cartridge above the tape. The door 20 is shown in its closed position over the tape. The tape 36 passes in front of the recessed wall 116 and behind the base plate front walls 114 and 118.

The tape cartridge is used by inserting it into a tape transport capable of reading and writing data on the ¼-inch tape. The cartridge slides forward into a receptacle of the tape transport to a locked position in which spring-loaded, roller-type latches (shown in phantom lines at 11) on opposite sides of the receptacle are engaged with the grooves 110 in the side flanges 78 of the base plate. Guide rails (not shown) along opposite sides of the tape transport receptacle ride in the cartridge guiding slots formed by the recessed regions 50 above the side flanges 78 of the base plate. The guide slots are used in guiding the cartridge into or out of the receptacle in the tape transport. The recessed regions 80 along opposite sides of the base plate provide clearance for lower portions of the guide rails of the standard tape transport. Inserting the cartridge into the receptacle causes the tripping arm 120 of the door to be forced against the bias of the tension spring 96 to open the door for exposing the tape for contact with the read/write head.

During use, rotation of the belt drive roller in a clockwise direction (as viewed in FIG. 1) causes the belt to traverse its guide path in a clockwise direction and the tape to move from the supply reel hub to the take-up reel hub. The frictional coupling between the belt guide rollers and their respective support shafts applies a predetermined drag to the belt as it passes around the guide rollers, thereby increasing the tension in the belt as it passes around each of the guide rollers. This increased tension in the belt increases the length of the belt, according to the elasticity of the belt, and thereby the speed at which the belt passes around the take-up reel over that at which it passes around the supply reel. This increased speed causes tension in the tape as well as the ability to take up any slack developed in the tape between the reel hubs.

The guide rollers can have a tensioning means in which the belt guide rollers 38 and 40 in the rear corners in the cartridge include a drag washer (not shown) for applying drag to the guide rollers to increase tension in the belt. The way that the drag on the belt 36 causes tension in the tape is understood by assuming that the roller 34 is moving in the direction of the arrow 122 shown in FIG. 1 so that the belt is moving in the direction of the arrow 124 shown in FIG. 1. If there is drag on the belt, then the belt portion 36a, which is moving into the belt driving roller 34, is under higher tension then the belt portion 36b which is leaving the roller. The belt is constructed of an elastic material so that the belt portion 36a will be stretched slightly more than the other belt portion 36b. The slightly greater stretching of the belt portion 36a causes it to try to move the periphery of the take-up roll slightly faster than the periphery of the supply tape roll, producing in tension in the tape.

Since the mass of the ¼-inch tape 16 is greater than the standard 0.150-inch tape, the tape 16 can be tensioned more than the standard 0.150-inch tape to avoid flutter and related problems of tape slack (due to the increased mass) and its effects on tape control and resolution accuracy. The tape can be operated at the greater tension than the standard 0.150-inch tape, if desired, by adjusting the tension on the belt guide rollers 38 and 40 to increase belt tension. Tape tension also can be controlled by characteristics of the tape drive belt itself.

Thus, the cartridge housing has a base plate with a stepped-down lower portion below the cartridge guiding slots. The stepped-down portion provides greater depth to the interior of the housing for accommodating the wider ¼-inch tape. The tape tension can be increased to control the wider ¼-inch tape during use. The side flanges above the stepped-down portion of the base plate cooperate with the recessed regions along the sides of the cover and with the flanges at the top of the cover to provide cartridge guiding slots for guiding the cartridge into the tape transport. The tape transport latching rollers are engaged with the grooves in the side flanges of the base plate for locking the cartridge in the tape transport. The spacing between the flanges at each side of the cartridge, the location of the locking grooves, and the length of the cartridge guiding slots are identical to the standard dimensions for 0.150-inch tape cartridges. This allows the ¼-inch tape cartridge of this invention to be used interchangeably with the standard 0.150-inch mini-cartridge in a single tape transport. In this instance, the receptacle in the tape transport has a recessed open space below the cartridge guide rails that accommodates the stepped-down lower portion of the base plate. The stepped-down base plate of the cartridge of this invention also adds greater structural integrity to the finished cartridge when compared with a cartridge having a flat base plate.

What is claimed is:

1. Apparatus for increasing the data recording track packing density in a belt-driven tape cartridge of the type which includes a cartridge housing, a pair of reels in the housing for holding a magnetic tape, an endless belt extending around portions of the carried on the reels, and a belt-driving roller for engagement with a drive capstan of a tape transport for driving the belt to move the tape past a magnetic read/write head in the tape transport and in contact with a portion of the tape in the cartride housing, in which the cartridge housing comprises a base plate joined to a cover plate for forming the cartridge housing, opposing side flanges extending at an intermediate elevation along opposite sides of the cartridge housing, in which opposing upper grooves extend along opposite side walls of the cover plate at an elevation above the side flanges, in which the side flanges extend along opposite side walls of the base plate, and in which opposing lower recessed regions extend along the opposite side walls of the base plate below the side flanges, the side walls of the cover plate and the base plate being juxtaposed when the two base plates are joined to form the cartridge housing, and in which the lower recessed regions of the base plate extend along opposite sides of a stepped down recessed wall portion of the base plate for providing sufficient depth to the internal spacing within the cartridge housing below the side flanges of the housing for permitting the tape contained within the housing to be up to ¼-inch in width, the tape being wound on reels within the cartridge housing of sufficient width to accommodate the width of the tape.

2. Apparatus according to claim 1 including grooves formed in the side flanges of the base plate for engagement with a latching device in the tape transport.

3. Apparatus according to claim 1 in which the recessed wall portion of the base plate extends around the entire perimeter of the base plate to provide the increased depth to accommodate the width of the ¼-inch tape.

4. Apparatus according to claim 1 in which the belt is wound about a belt driving roller and about a pair of corner belt guide rollers in the cartridge housing, the belt driving roller and the belt guide rollers being crown-shaped rollers.

5. Apparatus according to claim 4 including tension adjusting means on the corner rollers for increasing belt tension.

* * * * *

UNITED STATES PATENT AND TRADEMARK OFFICE
CERTIFICATE OF CORRECTION

PATENT NO. : 4,642,721

DATED : February 19, 1987

INVENTOR(S) : GEORGENS ET AL.

It is certified that error appears in the above-identified patent and that said Letters Patent is hereby corrected as shown below:

In the Specification:
Column 4, line 27, delete "the" (second occurrence);
line 68, after "FIG. 3 is" insert -- a --.
Column 6, line 50, change "then" to -- than --;
line 56, delete "in" (first occurrence).

In the Claims:
Column 7, line 31, before "carried" insert -- tape --;
line 36, change "cartride" to -- cartridge --.

Signed and Sealed this

First Day of December, 1987

Attest:

DONALD J. QUIGG

*Attesting Officer*     *Commissioner of Patents and Trademarks*